(12) United States Patent
Jan et al.

(10) Patent No.: US 9,176,936 B2
(45) Date of Patent: Nov. 3, 2015

(54) TRANSLITERATION PAIR MATCHING

(71) Applicant: International Business Machines Corporation, Armonk, NY (US)

(72) Inventors: Ea-Ee Jan, Ardsley, NY (US); Niyu Ge, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 331 days.

(21) Appl. No.: 13/630,479

(22) Filed: Sep. 28, 2012

(65) Prior Publication Data
US 2014/0095143 A1  Apr. 3, 2014

(51) Int. Cl.
*G06F 17/22* (2006.01)
*G06F 17/27* (2006.01)

(52) U.S. Cl.
CPC ........ *G06F 17/2223* (2013.01); *G06F 17/2294* (2013.01); *G06F 17/273* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC .......................................................... 704/2–8
See application file for complete search history.

(56) References Cited

U.S. PATENT DOCUMENTS

| | | | |
|---|---|---|---|
| 7,376,648 B2 * | 5/2008 | Johnson | 1/1 |
| 8,706,474 B2 * | 4/2014 | Blume et al. | 704/7 |
| 2003/0200079 A1 * | 10/2003 | Sakai | 704/8 |
| 2004/0117192 A1 * | 6/2004 | Miletzki | 704/277 |
| 2007/0021956 A1 * | 1/2007 | Qu et al. | 704/8 |
| 2007/0124133 A1 * | 5/2007 | Wang et al. | 704/10 |
| 2008/0221866 A1 * | 9/2008 | Katragadda et al. | 704/8 |
| 2008/0270111 A1 * | 10/2008 | Hanumanthappa | 704/3 |
| 2009/0070095 A1 * | 3/2009 | Gao | 704/2 |
| 2009/0125477 A1 * | 5/2009 | Lu et al. | 707/1 |
| 2009/0144049 A1 * | 6/2009 | Haddad et al. | 704/3 |
| 2009/0182547 A1 * | 7/2009 | Niu et al. | 704/2 |

(Continued)

OTHER PUBLICATIONS

Ea-Ee Jan et al. Transliteration Retrieval Model for Cross Lingual Information Retrieval. AIRS 2010, Springer Lecture Notes Computer Science 6458, p. 183-192, 2010.

(Continued)

*Primary Examiner* — Lamont Spooner
(74) *Attorney, Agent, or Firm* — Louis J. Percello; Otterstedt, Ellenbogen & Kammer, LLP

(57) ABSTRACT

Feature sequences are extracted, as individual letters separated by spaces, from a digital representation of a proper name in a first language to obtain a first orthographic feature sequence set; and from a digital representation of a proper name in a second language to obtain a second orthographic feature sequence set. The first and second orthographic feature sequence sets (a transliteration pair) are compared to determine a similarity score, based on a similarity model including a plurality of conditional probabilities of known orthographic feature sequences in the first language given known orthographic feature sequences in the second language and a plurality of conditional probabilities of known orthographic feature sequences in the second language given known orthographic feature sequences in the first language. Based on at least one threshold value, it is determined whether the transliteration pair belong to an identical actual proper name.

25 Claims, 9 Drawing Sheets

(56) References Cited

U.S. PATENT DOCUMENTS

| | | | |
|---|---|---|---|
| 2009/0281788 A1* | 11/2009 | Elizarov et al. | 704/3 |
| 2009/0319257 A1* | 12/2009 | Blume et al. | 704/7 |
| 2009/0326914 A1* | 12/2009 | Joy et al. | 704/3 |
| 2010/0094614 A1* | 4/2010 | Bilac et al. | 704/2 |
| 2010/0106484 A1* | 4/2010 | U et al. | 704/5 |
| 2010/0138211 A1* | 6/2010 | Shi et al. | 704/3 |
| 2010/0185670 A1* | 7/2010 | Krishnan et al. | 707/776 |
| 2011/0137635 A1* | 6/2011 | Chalabi et al. | 704/2 |
| 2011/0178792 A1* | 7/2011 | Shi | 704/3 |
| 2011/0218796 A1* | 9/2011 | Suzuki et al. | 704/2 |
| 2012/0041751 A1* | 2/2012 | Elfeky et al. | 704/2 |
| 2012/0239834 A1* | 9/2012 | Davtchev et al. | 710/67 |
| 2012/0259614 A1* | 10/2012 | De Bruyn et al. | 704/3 |
| 2012/0290286 A1* | 11/2012 | Davtchev et al. | 704/3 |
| 2013/0035926 A1* | 2/2013 | Ushakov et al. | 704/2 |
| 2013/0246042 A1* | 9/2013 | Hagiwara | 704/2 |
| 2013/0275117 A1* | 10/2013 | Winer | 704/3 |
| 2014/0012563 A1* | 1/2014 | Caskey et al. | 704/2 |
| 2014/0163952 A1* | 6/2014 | Brawer et al. | 704/5 |

OTHER PUBLICATIONS

Ea-Ee Jan et al. A Novel Approach for Proper Name Transliteration Verification. ISCSLP 2010, p. 89-94, 2010.

Kishore Papineni et al. BLEU: a Method for Automatic Evaluation of Machine Translation. Proceedings of the 40th Annual Meeting of the Association for Computational Linguistics (ACL), Philadelphia, Jul. 2002, pp. 311-318.

Viterbi algorithm. Download from http://en.wikipedia.org/wiki/Viterbi_algorithm on Sep. 15, 2012, pp. 1-8.

Kumaran A, Mitesh Khapra and Haizhou Li, Report of NEWS 2010 Transliteration Mining Shared Task. In Proc of 2010 Names Entities Workshop, ACL 2010, pp. 21-28, 2010.

Haizhou Li, A Kumaran, Vladimir Pervouchine, and Min Zhang, 2009. Report on news 2009 machine transliteration shared task. In Proceedings of ACLIJCNLP 2009 Named Entities workshop. pp. 1-18, Singapore, 2009.

Haizhou Li, Kumaran A, Zhang M. and Pervouchine V. Report of NEWS 2010 Transliteration Generation Shared Task. In Proceedings of ACL2010 Named Entity Workshop, pp. 1-11, 2010.

Lalit Bahl, Frederick Jelinek, and Robert Mercer, A Maximum likelihood approach to continuous speech recognition, IEEE Transaction on Pattern Analysis and Machine Intelligence, vol. PAMI-5, No. 2, 1983, pp. 179-190.

Omniglot Online Encyclopedia of Writing Systems and Languages, Japanese Katakana, copyright 1998, downloaded from http://www.omniglot.com/writing/japanese_katakana.htm on Apr. 17, 2015, pp. 1-4.

Kevin Knight and Jonathan Graehl, 1998. Machine transliteration. Computational Linguistics, 24(4), pp. 599-612, 1998.

Helen M. Meng, Wai-Kit Lo, Berlin Chen and Karen Tang. 2001. Generate Phonetic Cognates to Handle Name Entities in English-Chinese cross-language spoken document retrieval, Proceeding of ASRU 2001, pp. 1-4, 2001.

Alexandre Klementiev and Dan Roth 2006, Named entity transliteration and discovery from multilingual comparable corpora. In Proceedings of the ACL 2006, pp. 82-88 (2006).

* cited by examiner

| MODEL | EER |
|---|---|
| ORTHOGRAPHIC EDIT DISTANCE | 22% |
| ALPHABET-BASED ORTHOGRAPHIC SMT | 6.47% |
| PHONETIC SMT | 7.10% |
| FRAMEWORK WITH $M_{SMT}$ | 3.73% |
| EXEMPLARY INVENTIVE FRAMEWORK WITH $M_{MCE}$ | 3.33% |

FIG. 3

| TEST | 1K-TRAINING | | | 3K-TRAINING | | |
|---|---|---|---|---|---|---|
| | $M_{SMT}$ | $M_{MCE}$ | CHANGE | $M_{SMT}$ | $M_{MCE}$ | CHANGE |
| 10K | 1.37 | 1.27 | 7.06% | 1.15 | 1.09 | 5.15% |
| 100K | 1.35 | 1.25 | 7.65% | 1.17 | 1.11 | 5.52% |
| 1M | 1.39 | 1.26 | 9.09% | 1.18 | 1.13 | 5.05% |
| 9M | 1.38 | 1.26 | 8.86% | 1.18 | 1.12 | 5.23% |
| | 30K-TRAINING | | | | | |
| 10K | 1.07 | 1.02 | 4.63% | | | |
| 100K | 1.11 | 0.99 | 10.42% | | | |
| 1M | 1.17 | 1.00 | 14.47% | | | |
| 9M | 1.16 | 0.99 | 14.6% | | | |

FIG. 4

| TEST | 1K-TRAINING | | | 4K-TRAINING | | |
|---|---|---|---|---|---|---|
| | $M_{SMT}$ | $M_{MCE}$ | CHANGE | $M_{SMT}$ | $M_{MCE}$ | CHANGE |
| 10K | 1.23 | 1.12 | 9.00% | 1.12 | 0.99 | 10.79% |
| 100K | 1.21 | 1.16 | 4.03% | 1.10 | 1.02 | 7.96% |
| 1M | 1.20 | 1.13 | 5.85% | 1.09 | 1.00 | 8.67% |

*FIG. 5*

| TEST | 1K-TRAINING | | | 4K-TRAINING | | |
|---|---|---|---|---|---|---|
| | $M_{SMT}$ | $M_{MCE}$ | CHANGE | $M_{SMT}$ | $M_{MCE}$ | CHANGE |
| 10K | 2.33 | 2.11 | 9.44% | 2.09 | 2.02 | 3.35% |
| 100K | 2.40 | 2.19 | 8.75% | 2.07 | 2.07 | – |
| 1M | 2.40 | 2.19 | 8.75% | 2.09 | 2.08 | 0.48% |

| | 28K-TRAINING | | |
|---|---|---|---|
| 10K | 1.77 | 1.71 | 3.39% |
| 100K | 1.76 | 1.70 | 3.41% |
| 1M | 1.76 | 1.71 | 2.84% |

FIG. 6

| TEST | 1K-TRAINING | | 3K-TRAINING | |
|---|---|---|---|---|
| | FR | FA | FR | FA |
| 10K | 0.79% | 1.01% | 0.76% | 0.78% |
| 100K | | 0.93% | | 0.73% |
| 1M | | 0.56% | | 0.73% |
| 9M | | 0.57% | | 0.73% |
| | 30K-TRAINING | | | |
| 10K | 0.59% | 0.64% | | |
| 100K | | 0.55% | | |
| 1M | | 0.56% | | |
| 9M | | 0.57% | | |

FIG. 7

| TEST | 1K-TRAINING | | 4K-TRAINING | |
|---|---|---|---|---|
| | FR | FA | FR | FA |
| 10K | 0.73% | 1.07% | 0.46% | 1.13% |
| 100K | | 1.04% | | 1.08% |
| 1M | | 1.05% | | 1.09% |

FIG. 8

| TEST | 1K-TRAINING | | 4K-TRAINING | |
|---|---|---|---|---|
| | FR | FA | FR | FA |
| 10K | 1.80% | 0.92% | 1.13% | 0.78% |
| 100K | | 1.15% | | 1.01% |
| 1M | | 1.16% | | 0.99% |

| | 28K-TRAINING | |
|---|---|---|
| 10K | 1.08% | 0.73% |
| 100K | | 0.94% |
| 1M | | 0.93% |

FIG. 9

| JAPANESE KATAKANA | ENGLISH | ROMANIZED JAPANESE |
|---|---|---|
| レーブ | Low | re_bu |
| ビュデ | Bade | byude |
| ズバー | Zwar | zuba_ |
| ムジェール | Mjor | muje_ru |
| ベア | Beer | bea |
| ベーア | Bar | be_a |
| ミロスラフ | Cipar | mirosurafu |
| チャーチ | Chruch | ch a_ch i |

FIG. 10

| TEST | 1K-TRAINING | 3K-TRAINING | 30K-TRAINING |
|---|---|---|---|
| 10K | 0.87% | 0.73% | 0.58% |
| 100K | 0.88% | 0.74% | 0.55% |
| 1M | 0.87% | 0.73% | 0.56% |
| 9M | 0.87% | 0.73% | 0.56% |

FIG. 11

| TEST | 1K-TRAINING | 4K-TRAINING |
|---|---|---|
| 10K | 0.81% | 0.74% |
| 100K | 0.83% | 0.78% |
| 1M | 0.83% | 0.79% |

FIG. 12

| TEST | 1K-TRAINING | 4K-TRAINING | 28K-TRAINING |
|---|---|---|---|
| 10K | 1.52% | 0.97% | 0.96% |
| 100K | 1.53% | 1.05% | 1.05% |
| 1M | 1.55% | 1.04% | 1.04% |

| Paul | Teresa |
|---|---|
| /p ao l/ | /t ax r iy z ax/ |
| p ao\|b ao, l\|lu, null\|o | t\|d, null\|e, ax\|null, r\|l, iy\|ei, z ax\|sh a |
| /b ao lu o / | /d e l ei sh a/ |
| 保羅 | 德瑞莎 |

TRANSLITERATION PAIR MATCHING

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to natural language applications and the like.

BACKGROUND OF THE INVENTION

Transliteration is the process of proper name translation based on pronunciation. It is an important process in many multilingual natural language tasks. A common and essential component of transliteration approaches is a verification mechanism that tests if the two names in different languages are translations of each other. Although many systems have transliteration generation (recognition) as a component, stand-alone verification is relatively new.

SUMMARY OF THE INVENTION

Principles of the invention provide techniques for transliteration pair matching. In one aspect, an exemplary orthographic method for transliteration pair matching includes the step of extracting feature sequences, as individual letters separated by spaces, from a digital representation of a proper name in a first language to obtain a first orthographic feature sequence set; and extracting feature sequences, as individual letters separated by spaces, from a digital representation of a proper name in a second language to obtain a second orthographic feature sequence set. The digital representation of the proper name in the first language and the digital representation of the proper name in the second language are a transliteration pair. Further steps include comparing the first and second orthographic feature sequence sets to determine a similarity score, based on a similarity model including a plurality of conditional probabilities of known orthographic feature sequences in the first language given known orthographic feature sequences in the second language and a plurality of conditional probabilities of known orthographic feature sequences in the second language given known orthographic feature sequences in the first language; and based on at least one threshold value, determining whether the transliteration pair belong to an identical actual proper name.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

better accuracy than previous techniques;
no need for complex training process;
robust;
language independent.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 shows exemplary Chinese-English data, in accordance with an aspect of the invention;

FIG. 4 shows exemplary Korean-English data, in accordance with an aspect of the invention;

FIG. 5 shows exemplary Japanese-English data, in accordance with an aspect of the invention;

FIG. 6 shows exemplary Chinese-English false rejection (FR) and false acceptance (FA) rates, in accordance with an aspect of the invention;

FIG. 7 shows exemplary Korean-English false rejection (FR) and false acceptance (FA) rates, in accordance with an aspect of the invention;

FIG. 8 shows exemplary Japanese-English false rejection (FR) and false acceptance (FA) rates, in accordance with an aspect of the invention;

FIG. 9 shows exemplary Japanese-English problematic pairs;

FIGS. 10-12 show exemplary orthographic results for Chinese-English, Korean-English, and Japanese-English, respectively, in accordance with aspects of the invention;

DETAILED DESCRIPTION OF PREFERRED EMBODIMENTS

Figures 1, 2:
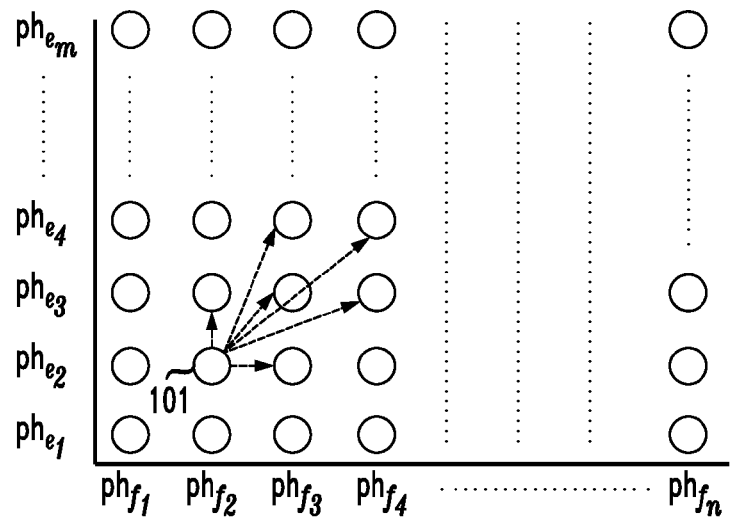
FIG. 1 shows a Hidden Markov Model (HMM) trellis, in accordance with an aspect of the invention.
FIG. 2 shows exemplary Chinese-English results, in accordance with an aspect of the invention.

One or more embodiments advantageously provide an effective and robust framework for transliteration exploration. Transliteration is the process of proper name translation based on pronunciation. It is an important process in many multilingual natural language tasks. A common and essential component of transliteration approaches is a verification mechanism that tests if the two names in different languages are translations of each other. Although many systems have transliteration generation (recognition) as a component, stand-alone verification is relatively new.

One or more embodiments advantageously provide a simple, effective and robust training framework for the task of verification. Many exemplary applications of the verification techniques are set forth herein. One or more embodiments operate on orthographic inputs. In at least some instances, a simple, straightforward orthographic representation is sufficient and no complex training method is needed.

With regard to effectiveness, one or more embodiments achieve good accuracy.

With regard to robustness, one or more embodiments are language-independent.

By way of presenting non-limiting exemplary results, in experiments, on Chinese and Korean, error rates well below 1% were achieved, and on Japanese, approximately 1% was achieved. The experiments were conducted using the 2009 and 2010 NEWS transliteration generation share task dataset; the skilled artisan will be familiar with same; nevertheless, the following are expressly incorporated herein in their entireties for all purposes:

Kumaran A, Mitesh Khapra and Haizhou Li, Report of NEWS 2010 Transliteration Mining Shared Task. In Proc of 2010 Names Entities Workshop, ACL 2010, pages 21-28

Haizhou Li, A Kumaran, Vladimir Pervouchine, and Min Zhang, 2009. Report on news 2009 machine transliteration shared task. In Proceedings of ACLIJCNLP 2009 Named Entities workshop. pages. 1-18, Singapore.

Haizhou Li, Kumaran A, Zhang M. and Pervouchine V. Report of NEWS 2010 Transliteration Generation Shared Task. In Proceedings of ACL2010 Named Entity Workshop, Pages 1-11

One or more embodiments of orthographic systems in accordance with aspects of the invention outperform prior art phonemic systems. This is advantageous because the orthographic inputs are easier to generate, and because it is not necessary to resort to more complex training algorithms to achieve good results.

One non-limiting exemplary application of one or more embodiments of the invention is proper name based cross-lingual information retrieval without translation.

Proper name transliteration is important in many multilingual natural language processing tasks, such as Machine Translation (MT), Cross Lingual Information Retrieval (CLIR), multilingual spoken document retrieval, and transliteration mining. The research community has investigated automatic proper name transliteration generation.

Alternatively, methods for transliteration verification have begun to draw attention in the research community. Given a pair of proper names in the source and target languages, the task is to decide whether they are transliterations of each other. This task is important for many applications. For example, in word alignment, the unknown words are handled by computing a similarity score with the words in the target language. A similarity score derived from transliteration verification has been successfully applied to cross lingual information retrieval (CLIR) in an approach wherein CLIR can be achieved without translation of input proper name queries. This technique is useful in creating proper name pair training data.

Advantageously, one or more embodiments provide a technique that can reliably identify name pairs in different languages; this is useful, for example, given the vast amount of comparable data on the Internet. A new "NEWS Transliteration Mining task" was launched in A. Kumaran et al, supra. This task depends heavily on the accuracy of proper name verification techniques. One or more embodiments provide a framework for transliteration verification. One or more embodiments provide an accurate scoring mechanism that achieves good results. The research community has been using methods such as word error rate, Equal Error Rate (EER), precision and recall and many variants as metrics to evaluate systems. However, due to homonyms and phone-set differences across multiple languages, word error rate is not always sufficient to distinguish transliteration accuracy. One or more embodiments provide a simple, accurate, robust, novel, and reliable metric in evaluating transliteration systems; the simplicity, accuracy, and robustness are believed to be particularly suitable for use as an automatic metric.

It is worth noting that heretofore, the problem of name transliteration has been viewed as a translation problem. Statistical machine translation (SMT) models have been applied to translate English names into Chinese characters. A generative transliteration model for Japanese and English using finite state transducers has been proposed. An English-Chinese Named Entity transliteration technique has been developed using pronunciation lexicon and phonetic mapping rules. Direct orthographic mapping with a joint source-channel model for proper name transliteration has also been proposed.

There have also been other approaches to transliteration. Verification has been used as a stepping stone to transliteration. More recently, the importance of the similarity scoring method has been recognized and a comparative study has been conducted on the various scoring methods for name transliterations.

Data harvesting is another way of improving transliteration. Additional data sources such as comparable corpora and the web have also been explored to improve the performance. One significant building block in all of these approaches is a scoring component that tests how likely it is that a given pair of names in source and target languages are transliterations of each other. This is a significant component and is the focus of one or more embodiments of the invention. One or more embodiments provide a method for transliteration verification that achieves superior EER as compared to other approaches on the same dataset.

In one or more embodiments, the verification is taken as a stand-alone problem, the solution of which has a variety of NLP applications. Accurate and robust techniques are employed in one or more embodiments. The verification task can be cast into an alignment problem. Note that a generative model for alignment can be used to render similarity relationships between the source and target name pairs in phone sequences. In phoneme-based systems where phoneme generation might be ambiguous and error prone, a discriminative training method can be employed together with an HMM-based decoding strategy that works well within the framework. In orthographic systems in accordance with one or more embodiments, where the input can be reliably generated, the HMM-based strategy is sufficient.

Transliteration between English and foreign languages, especially Asian languages (e.g. Chinese), remains a significant challenge. One or more embodiments employ verification techniques for transliteration. To that end, one or more embodiments provide a high quality verification mechanism. For a given proper name pair, one from the source language and the other from the target language, it is desired to verify, with high precision, whether this pair refers to the same proper name. One or more embodiments provide a scoring method that yields high accuracy with low computational complexity.

Intuitively, proper name transliteration "translates" a proper name based on pronunciation. For a pair including a foreign name $w_f$ and an English name $w_e$, the similarity can be defined as:

$$\text{Sim}(w_f, w_e) \approx \text{Sim}(ph_f, ph_e), \quad (1)$$

where $ph_f$ and $ph_e$ are the corresponding orthographic sequences (i.e., using letters separated by spaces rather than phonemes) for the English and foreign names, respectively. Eq. (1) can be formulated as $$\text{Sim}(ph_f, ph_e) = \lambda P(ph_f | \Lambda_{ph_e}) + (1-\lambda) P(ph_e | \Lambda_{ph_f}) \quad (2)$$

where $\Lambda_{ph_e}$ and $\Lambda_{ph_f}$ are the English and foreign orthographic models, respectively. For simplification, it can be assumed that $\lambda=0.5$ since the similarity function could be symmetric. Because the distributions of $P(ph_f | \Lambda_{ph_e})$ and $P(ph_e | \Lambda_{ph_f})$ are unknown, they should be estimated through learning. Discussed below are details of the discriminative training process and HMM-based decoding strategies to find the optimal alignment between $ph_f$ and $ph_e$.

Model Estimation Via SMT

One straightforward way to estimate the model parameters is to utilize the phrase tables produced by a phrase-based SMT framework. The phrase tables contain conditional probabilities of both p(e|f) and p(f|e), which are the probabilities of the English phrase given by the foreign phrase and the foreign phrase given by the English phrase, respectively. When the phonetic sequences (either phonemic or orthographic) of English and foreign name pairs are the input into the SMT, the "phrase" table contains the phone set mappings between the English and foreign phone sets together with their probabilities. One or more embodiments use these probabilities as the observation model in an HMM. This model is referred to as Model Estimation Via Discriminative Training The discriminative training process involves finding an initial seed model and training in a decision-feedback learning framework.

One straightforward way to get an initial estimation for $P(ph_f | \Lambda_{ph_e})$ and $P(ph_e | \Lambda_{ph_f})$ is to utilize the phrase tables produced by the widely used phrase-based SMT system. The phrase tables contain both conditional probabilities of p(e|f) and p(f|e), which are the probabilities of the English phrase given by the foreign phrase and the foreign phrase given by the English phrase, respectively. When the phonetic sequences of English and foreign name pairs are fed into SMT, the "phrase" table contains the phone set mappings between English and foreign phone sets together with their probabilities. The phone set mapping is now data driven, and is free from the expensive and less flexible hand-crafted linguistic phone set mapping rules. This model is referred to as $M_{SMT}$.

$M_{SMT}$ is a straightforward and effective way to estimate the model parameters. Phoneme-based systems rely on the input texts being correctly converted to a baseforms (phonemic sequences) representation. This process can be ambiguous, context-dependent, and error prone. In such systems, $M_{SMT}$ serves as a good initial model. The model parameters can be further improved in a decision feed-back learning framework. The minimum classification error (MCE) training algorithm widely used in speech recognition can be applied here to improve the discrimination of the translation probability. This model is referred to as $M_{MCE}$. Given a correct transliteration pair and other competitive transliteration hypotheses, the transliteration error function is defined as:

$$d_i(ph_f | \Lambda_{P_e}) = -P(ph_f | \Lambda_{ph_e}) + \max_{f', f' \neq f} P(ph_{f'} | \Lambda_{ph_e}) \quad (3)$$

where $P(ph_f | \Lambda_{ph_e})$ is the alignment score obtained from the correct transliteration pair and $$\max_{f', f' \neq f} P(ph_{f'} | \Lambda_{ph_e})$$

is the highest competing score obtained from error transliteration pairs. The transliteration error function can be further transformed to a loss function ranging from 0 to 1 with the sigmoid operator:

$$l(d_i(ph_f | \Lambda_{ph_e})) = \frac{1}{1 + e^{(-\gamma d_i(ph_f | \Lambda_{ph_e}) + \theta)}} \quad (4)$$

where $\gamma$ is used to control the slope of the function and $\theta$ is an offset factor. The above equation is then applied iteratively to update the translation probability:

$$p^{t+1}(ph_f | ph_e) = p^t(ph_f | ph_e) - \varepsilon \frac{\partial l(d_i(ph_f | \Lambda_{P_e}))}{\partial p(ph_f | ph_e)} \quad (5)$$

Similarity Score Calculation

In order to calculate the similarity score for a given proper name pair ($w_f$, $w_e$), their respective orthographic sequence ($ph_f$, $ph_e$) is first determined. Then, for this task, an HMM-based decoding strategy is employed. The models $P(ph_f | \Lambda_{ph_e})$ and $P(ph_e | \Lambda_{ph_f})$ learned above are used as observation models. Two monotonic HMM models (one with $ph_f$ as states and one with $ph_e$ as states) are then used to align the orthographic sequences according to Eq. (6) below:

$$P^*(ph_f | \Lambda_{ph_e}) = \underset{S_e}{\operatorname{argmax}} P(ph_f, S_e | \Lambda_{ph_e}), \quad (6)$$

$$P^*(ph_e | \Lambda_{ph_f}) = \underset{S_f}{\operatorname{argmax}} P(ph_e, S_f | \Lambda_{ph_f})$$

where $S_e$ is the English state sequence and $S_f$ is the foreign state sequence.

The state transition probabilities are set to be uniform. The traditional HMM is extended to allow a broader range of mapping configurations. Specifically, the null transition is used to represent skipping a state without consuming any observations. The skilled artisan will be familiar with the null transition from Lalit Bahl, Frederick Jelinek, and Robert Mercer, *A Maximum likelihood approach to continuous speech recognition*, IEEE Transaction on Pattern Analysis and Machine Intelligence, vol. PAMI-5, No. 2, 1983, Pages 179-190; nevertheless, this Bahl et al reference is expressly incorporated herein by its entirety for all purposes. This allows one-to-null mapping. The null state is introduced so it can emit those observations without any correspondence states. This allows null-to-one mapping. The combination of null transition and null state allows many-to-many and many-to-one configurations as well. In an exemplary embodiment, the valid state transition is constrained to be from left to right with self loop, and with a maximum jump of three states as well as a null state and a null transition. Other embodiments could use other approaches; for example, the maximum jump could have another value such as four or five (or any other suitable value).

FIG. 1 depicts the actions of the HMM trellis at decode time. In FIG. 1, the x-axis represents the observations (foreign language, subscript f) and the y-axis represents the states (English, subscript e). Take for example, the circle 101 from which dashed lines with arrows are emanating. When this circle makes a horizontal move (from $ph_{f2}$ to $ph_{f3}$), the single state $ph_{e2}$ produces multiple observations. Null transition happens when the circle makes a vertical move (from $ph_{e2}$ to $ph_{e3}$) without consuming any observation.

Experimental Setup for Transliteration Similarity

The performance of a similarity scoring mechanism in accordance with one or more aspects of the invention was evaluated on three language pairs; namely, Chinese-English (CE), Korean-English (KE), and Japanese-English (JE). Both Type I errors (Use reject of the matched pairs) and Type II errors (false accept of the unmatched pairs) were evaluated. The Equal Error Rate (EER) was used as the evaluation metric.

For Chinese-English, a parallel corpus of proper name pairs was extracted from the public domain people section of the multilingual Wikipedia. Among these, approximately 3,000 pairs were used for training and 300 pairs for testing. The 300 pairs were used as a matched condition test. A separate 1000 unmatched test pairs were created randomly from the 300 matched pairs.

The 2009 and 2010 NEWS transliteration generation shared task data was also employed as test data. Although the test objective of the tests described herein was different from those in the shared task, this data was chosen because it is publicly available and can be used in the future for fair comparisons. The NEWS 2010 transliteration mining shared task dataset was not used because it did not contain Korean or Japanese (however, it could be used in other embodiments). For Chinese, the 2009 data includes 30K training and 2896 testing proper name pairs. Three systems were developed using 30K, 3K and 1K pairs of training data for the experiments. The 2896 proper name test pairs were used as matched pairs. Three unmatched test set pairs of size 10 k, 100 k and 1M were randomly generated. 9M (2985×2986) unmatched pairs were also generated as an extreme test condition.

The Korean-English data comes from the 2010 NEWS transliteration generation data. It includes 4,785 training pairs and 1,082 test pairs. Two systems with 1K and 4K of training pairs were developed; three sets of unmatched pairs of size 10K, 100K, and 1M were generated. The Katakana Japanese-English data is from the same set (2010 NEWS data). It is bigger than the Korean data with 28K training instances and 1941 test pairs. Three systems with 1K, 4K and 28K training pairs were developed; three sets of unmatched pairs of size 10K, 100K, and 1M were also generated.

Training on 1K data matches the 2010 NEWS transliteration mining shared task (Kumaran et al., supra) seed condition. Training on 3K-4K data matches the Wikipedia condition. Training on 28 k for Japanese-English and 30K on Chinese-English demonstrates the best performance achieved while using the entire available training corpus.

It should be emphasized that experimental data presented herein is intended to illustrate to the skilled artisan results that can be attained in some embodiments; it is not intended to be limiting as other embodiments may achieve different results.

In the experiments, edit distance is used for the baseline. The SMT transducer included an orthographic based SMT (Alphabet (English) to Alphabet (e.g. Chinese pinyin or other suitable Romanization technique). Language models (LMs) for each approach were developed using base corpus for SMT decoding. The experiments employed a phonetic left-to-right HMM. The model parameters were estimated by the phrase table from phrase based SMT training framework. Equal Error Rate (ERR) of false accept (unmatched pair) and false reject (matched pair) were used for performance evaluation.

Experiments were carried out with both phonemic and orthographic representations of input texts. The phonemic approach seems more intuitive since the transliteration is a pronunciation-based translation. The orthographic system is simple because it does not require additional baseform generation tools to convert proper names to phonemic sequences, and it does not need to address the multiple pronunciation issue. Heretofore, phonetic/phonemic features have been used because they contain more information, and because transliteration is phonetic in nature. However, surprisingly, we have found that even though orthographic features include less information they actually yield better performance.

For Chinese, the orthographic form of a character is its Pinyin. Tones in Pinyin are removed. Korean and Japanese characters are converted according to known Romanization tables. Eleven additional rules were added to the Japanese conversion process to deal with short versions of a few vowels and consonants. These eleven characters are: ァ, ィ, ゥ, ェ, ォ, ヵ, ヶ, ュ, ョ, ヮ, ー, and ッ. In orthographic systems, the Pinyin (for Chinese), Romanized spellings (for Korean and Japanese), and word spellings (for English) are then segmented into space-delimited alphabet streams. For example, the English word 'Robinson' is segmented into eight letters separated by spaces, thus:

'r o b i n s o n'.

In phoneme-based systems, diphthongs (such as 'oi', 'ae') and compound consonants (such as 'sh') are treated as one unit. The English and Chinese baseforms were generated automatically from a speech recognition vendor toolkit (non-limiting examples include IBM ViaVoice, International Business Machines Corporation, Armonk, N.Y., USA; Nuance Communications, Inc.; or CMU Sphinx from Carnegie Mellon University, Pittsburgh, Pa., USA). Multiple pronunciations for a given word were considered uniformly distributed. All possible combinations of pronunciation were created in both the training and the testing sets. All possible pronunciation combinations were used for training. The best score for all possible pronunciation combinations for a given proper pair was used for the final score in testing.

In addition to the new approach described above, two phrase-based SMT systems, orthographic and phonemic based approaches, were built for the Chinese-English Wikipedia datasets as a baseline. This SMT approach has been widely used and yields solid performance in shared tasks. Equation (1) is reformulated as:

$$\text{Sim}(w_e, w_f) \cong \text{Sim}(tr(w_e), w_f) \approx \text{BLEU}(tr(w_e), w_f) \qquad (7)$$

where $tr(w_e)$ is the translation of $w_e$.

BLEU (Bilingual Evaluation Understudy), an algorithm for evaluating the quality of text which has been machine-translated from one natural language to another, was employed because it is more favorable to n-gram matches and is smoother than edit distance. While the skilled artisan will be familiar with same from Kishore Papineni et al., BLEU: a Method for Automatic Evaluation of Machine Translation, Proceedings of the 40th Annual Meeting of the Association for Computational Linguistics (ACL), Philadelphia, July 2002, pp. 311-318, the same is nevertheless expressly incorporated herein by reference in its entirety for all purposes.

A phonetic-based SMT and an alphabet orthographic-based SMT were built. In the former, the parallel data was converted to phonetic sequences using its own phone set. In the orthographic SMT, the proper names were converted to their Pinyin in spelling form. The English proper names were put into spelling form as well. The standard SMT training recipe was then applied.

Experimental Results

The CE Wikipedia results are shown in FIG. 2. Model $M_{SMT}$ outperforms the traditional SMT methods and the orthographic edit distance approach. The $M_{MCE}$ approach, in accordance with an aspect of the invention, further reduces the EER and achieves the best EER of 3.33%. This low EER shows that the verification approach in accordance with one or more embodiments is highly reliable.

Results on the NEWS data are shown in FIGS. 3-5 for CE, KE, and JE respectively. Each figure shows results of $M_{SMT}$, $M_{MCE}$ and relative improvement (in that order) under different training and test conditions. From FIG. 3, it can be seen that an approach in accordance with one or more embodiments yields less than 1.4% of EER using only 1K training pairs. Using 3K training data, an approach in accordance with one or more embodiments achieves ERR under 1.2%, which is comparable to the system using 30K training pairs. The MCE can further improve the performance relatively by 5-14%. In addition, the performance is very stable against all different unmatched test conditions, especially at the 9M unmatched test pair condition.

The Japanese-English set performs worse than either Chinese or Korean. Upon inspection of the data, it was found that the majority of the problems were due to incorrect baseform representations. This, in turn, is because the Japanese data contains more non-English names. For example, in the JE test set, there were 1941 matched pairs. For a 2% false reject rate, approximately 38 matched pairs were false rejected. Out of these false-reject entries, about a third were European names. FIG. 9 shows a few such examples. The bottom two entries in this table are actually incorrect transliteration pairs, which means that they should be rejected, but the system is penalized because the reference truth is not entirely clean. This is an example of using a method in accordance with one or more embodiments as a data screening tool to sift through the data and automatically pick out suspicious pairs. Because of the high accuracies attainable with one or more embodiments, those questionable pairs can be either reliably excluded or down-weighted. They can also be given to annotators for further inspection. Instead of scanning through the entire dataset, human annotators can focus on just the disputable pairs that the system picks out. This annotation process is both efficient and cost-effective.

Orthographic results are shown in FIGS. 10-12 for CE, KE, and JE respectively. It is evident from the tables that in the examples shown, orthographic-based systems are significantly better than the phoneme-based systems without using the more complex model $M_{MCE}$. These results are promising because orthographic representations do not need to deal with diphthongs and compound consonants. Every alphabet is a token by itself. In FIG. 9 for example, 'r e_b u' in the first row will have '_' separated from 'e' in its orthographic form. These results are also promising because the results in FIGS. 10-12 are from systems using the straightforward SMT method without further discriminative training by MCE. This simplifies the overall system architecture and makes the system more efficient and effective.

One reason orthographic models typically perform better than phonemic models is that baseform generation is ambiguous and error-prone. In one or more embodiments, baseforms are statistically trained from a generic model. The conversion from input texts to their baseforms is a lossy process. The errors in Japanese show a clear example. When the names are non-English, the English baseforms all become incorrect which leads to verification errors. The orthographic representation alleviates this problem quite significantly and thus is able to improve the system. In addition to measuring ERR, the False Rejection (FR) rate of the matched proper name pairs and the False Acceptance (FA) rate of the unmatched pairs were also measured. FIGS. 6-8 detail the results for all the language pairs (CE, KE, and JE, respectively) under all testing and training conditions. For each language pair, under the same training conditions, the FR rate is the same because, given a fixed threshold, the number of matched pairs is the same.

FA and FR results in the above tables show that the exemplary system is quite robust. Across all language pairs, FA and FR rates improve consistently as the training data size gets larger. The rates also remain stable across test data of different sizes.

One or more embodiments thus provide a simple and effective transliteration verification framework. On the 2009 and 2010 NEWS transliteration generation shared task data, EER well below 1% was achieved for Chinese and Korean, and around 1% for Japanese. These promising results show that verification can be reliably used for exploring name pairs from comparable data. As demonstrated herein, one or more embodiments can be used, for example, in CLIR applications.

By way of review, transliteration generation is a process of proper name translation based on pronunciation. Due to the pronunciation differences across different languages, the basic phone set in both languages can be very different, which can lead to many-to-one, one-to-many or many-to-many or even one-to-none mapping for the given language pairs. By adding homophone(s), the transliteration generation can lead to many possible answers. In one or more embodiments, instead of addressing transliteration generation, transliteration verification is addressed. One or more embodiments provide a simple, effective approach to verify whether a given transliteration pair indeed belongs to the same proper name. One or more embodiments can be used for transliteration generation performance matrices, transliteration generation by verification, post-processing by after n-best transliteration generation, cross language information retrieval, and/or cross language named entities matches.

One or more embodiments employ weighted edit distance measurement as bases of alignment for the given pairs. The weights are trained by phrase-table based SMT framework. The input is orthographic features rather than phonetic features. Therefore, it is not necessary to convert proper names to pronunciation symbols.

For each language, a certain amount of parallel training corpus (list of proper name pairs between two languages) is first created. All languages are Romanized first if they are not in alphabet spelling. The phrase table based SMT framework is applied to extract phrase table. The phrase length is limited to a small number, e.g. 2 to 4, depending on the language structure of the given language pairs). The phrase table is the weights for weighted edit distance, which can be easily implemented by DTW (dynamic time warping). Three language pairs (English<->Chinese, English<->Japanese, English<->Korean) are tested in the approach. With approximately 3 k-4 k pairs of training data, and approximately 1 k of test data, one or more embodiments achieve less than 1% (<1%) Equal Error Rate.

Thus, one or more embodiments use orthographic HMM-based alignment for transliteration verification. This approach is simple, as no phonetic information is required, there is no need for baseforms generation, and there is no out of vocabulary (oov) issue. The left-to-right HMM alignment includes null probability and multiple state/observation consumption. Observation probabilities are estimated from phrase table (P(e|f), and p(f|e)).

Again, transliteration is the task to "translate" a given proper name based on its pronunciation. Transliterations are not unique.

Transliteration verification is undertaken to verify if a given proper name pair (English↔ Foreign) refer to the same proper name. An evaluation matrix may include choices such as matched, mismatched, somewhat matched, somewhat mismatched, and so on.

Applications of transliteration verification include cross lingual information retrieval; cross lingual named entities link, for cross lingual information extraction; transliteration evaluation matrix; transliteration mining to extract more training pairs for transliteration task; and/or supervised alignment in SMT training (e.g. MaxEnt based alignment).

Approaches for transliteration verification include an orthographic based approach with proper names Romanization when necessary; phonetic based approaches, wherein names are converted names to phonetic sequences; and using a transliteration similarity score $Sim(w_e, w_f)$ and a threshold for the operation point.

Furthermore in this regard, with regard to common approaches for transliteration verification, orthographic approaches edit distance of names between source and target language for similarity calculation, and employ an orthographic based SMT transducer. These treat transliteration as an SMT problem, and use the existing SMT framework. Similarity is calculated between the target name and the translated target name. The comparison matrix can be edit distance, BLEU score, or the like.

Phonetic approaches convert proper name to phonetic sequence (baseforms) and calculate phonetic similarity. Issues that need to be addressed include the fact that there can be multiple baseforms for a given word; the phone sets can be different between the source and target languages; and baseforms for unknown words are needed. With regard to phonetic based edit distance, phone set mapping is required (manually, or data driven). With respect to a phonetic based SMT transducer, training the SMT models is carried out using parallel phone sequence data; the similarity between the target and translated target name (in phonetic forms) is calculated.

One or more embodiments provide techniques for transliteration similarity, utilizing an HMM-based transliteration framework. For a given proper name pair $(W_e, W_f)$, an HMM model is dynamically generated for $W_e$ to predict $W_f$ on the basis of their phonetic or alphabetic characteristics. Transition probabilities are set to uniform. The model can be phonetic or orthographic. The orthographic approach is simpler and outperforms the phonetic approach. Refer to Equations (1) and (2) above with λ=0.5 and note:

$$P(ph_f | \Lambda_{ph_e}) = \sum_{S_e} P(ph_f, S_e | \Lambda_{ph_e}) \propto \max_{S_e} P(ph_f, S_e | \Lambda_{ph_e}) \quad (8)$$

The model (observation probability) can first be estimated by a phrase based SMT framework. P(e|f) and p(f|e) can be estimated from the phrase table. Optionally, improvement can be had, in some instances, via Minimum Classification Error (MCE) training. There are a number of potential issues with transliteration similarity measurement. The source and target languages can sometimes have very different alphabets. The alphabets mapping can be "one to many," "many to one," "one to none," and so on. Alphabet differences between some data pairs are more significant than others. In one or more embodiments, it is believed that P(e|f) and p(f|e) are better estimated by model instead of hand crafted. In one or more embodiments, P(e|f) and p(f|e) are estimated from the phrase table. Furthermore, in one or more embodiments, null probability and multiple state/observation consumption are integrated into the left-to-right HMM alignment, and the length normalized HMM alignment score is used to calculate EER.

Figures 13, 14:
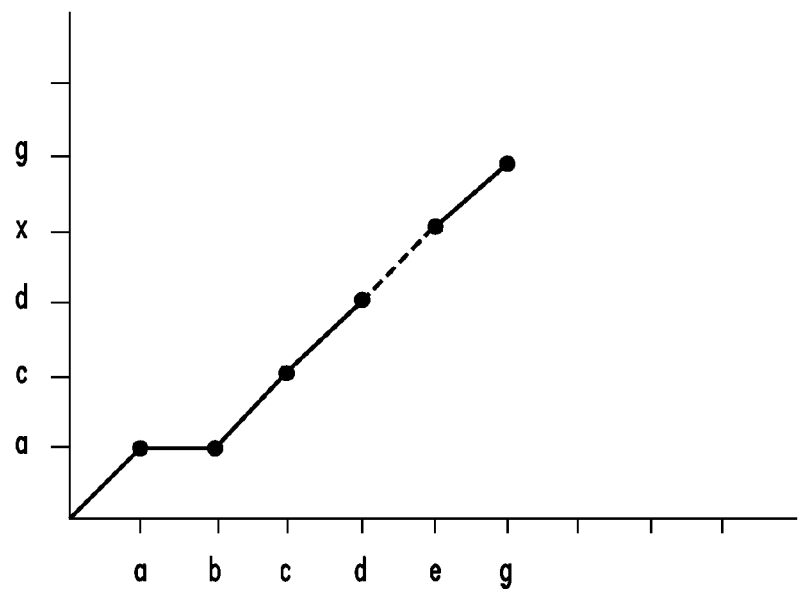
FIG. 13 shows insertion and substitution errors, in accordance with an aspect of the invention.
FIG. 14 illustrates transliteration similarity measurement, in accordance with an aspect of the invention.

In the phonetic approach, alphabets are replaced by phone set (see axes in FIG. 1). FIG. 14 also shows some examples of the phonetic approach. On the left, the English name Paul is broken into a phone set /p ao l/, and the putative corresponding Chinese characters are rendered in Pinyin and then the Pinyin is broken into a phone set /b ao lu o/. The comparison is then carried out between p ao and B ao, between l and lu, and between null and o. On the right, the English name Teresa is broken into a phone set /t ax r iy z ax/, and the putative corresponding Chinese characters are rendered in Pinyin and then the Pinyin is broken into a phone set /d e l ei sh a/. The comparison is then carried out between t and d, between null and e, between ax and null, between r and l, between iy and ei, and between z ax and sh a. To deal with these kinds of issues, one or more embodiments integrate the concept of null probability and multiple state/observation consumption into the left-to-right HMM alignment.

As noted, in some instances, improvement can be had via Minimum Classification Error (NICE) training (NICE training is optional). The transliteration error function can be defined as:

$$d_i(ph_f | \Lambda_{P_e}) = -P(ph_f | \Lambda_{ph_e}) + \max_{f', f' \neq f} P(ph_{f'} | \Lambda_{ph_e}) \quad (9)$$

The Sigmoid Loss function is:

$$l(d_i(ph_f | \Lambda_{ph_e})) = \frac{1}{1 + e^{(-\gamma d_i(ph_f | \Lambda_{ph_e}) + \theta)}} \quad (10)$$

The transliteration probability update function is:

$$p^{t+1}(ph_f | ph_e) = p^t(ph_f | ph_e) - \varepsilon \frac{\partial l(d_i(ph_f | \Lambda_{P_e}))}{\partial p(ph_f | ph_e)} \quad (11)$$

Comments are now provided regarding scores for threshold setting for operational points. In one or more embodiments, output of the transliteration verification task is either matched, unmatched, or other conditions. A score mechanism and threshold are appropriate to determine the outcome. The following score mechanisms are used for each approach in the experiments. For edit distance similarity, the Manhattan distance is employed. Score=0 means perfect match. An SMT transducer is employed for both orthographic and phonetic approaches. The BLEU score is determined between the target name and the translated target name. For example:

Input: Cindy O'Neal ↔ 辛迪·奥尼尔 (xin di ao ni er)
    SMT output=s i n d i o r n i l
Bleu between (c i n d y o n e a l)↔(s i n d i o r n i l)

Alternately, Manhattan distance can also be used. In one or more embodiments, the similarity score is the length normalized HMM alignment score.

Again, by way of review, transliteration refers to translation based on pronunciation. Consider, for example, how to render "President Robinson" in Chinese:

"President" can have a semantic translation.

"Robinson" is transliterated, no semantic translation.

Homophones refer to different words with the same pronunciation; this can occur in foreign languages as well as in English. Some English sounds do not exist in Chinese; the task in transliteration is then to pick something close. Since transliteration is a translation based on sound, transliteration is not exact. There may be many possible translations based on transliteration.

Transliteration is typically not needed between European languages using the Latin alphabet because the same alphabet is used in the different languages with the exception of a few accent marks and so on. The situation changes when one of the languages uses a different alphabet such as, for example, Cyrillic.

One or more embodiments are directed to carrying out a verification process instead of carrying out translation directly. In this aspect, consider a pair, e.g., Robinson in English and Robinson in Chinese—see if they belong to the same name or not, based on pronunciation. In effect, this changes the problem around. The prior techniques (attempt at translation) have a 40-50% error rate.

Other aspects address how to carry out, for example, a search on "Robinson" when there may be ten different ways to transliterate "Robinson" into Chinese. One or more embodiments of the invention are significantly more accurate than prior art techniques; for example, on the order of 1% error. That is to say, for a pair of words, e.g., in Chinese and English, one or more embodiments can tell with approximately 99% accuracy whether they belong to the same pair or not.

One or more embodiments generate a score and compare it to a threshold; if the threshold is exceeded, the words are a pair; else they are not. One or more embodiments employ a variety of function definitions. In some instances, convert to phonetic spelling and compare the differences between phone sets. In other cases, employ the alphabet directly without converting to a phone set; this is an orthographic approach used in one or more embodiments of the invention. In one or more embodiments, Chinese characters, whether traditional or simplified, are Romanized to Pinyin or the like.

A translation score can be obtained, for example, via a phrase table and/or Hidden Markov Models (HMM). One or more embodiments address the process as an alignment problem, wherein English and Chinese are examined side-by-side and the shortest path is determined.

Figure 16:
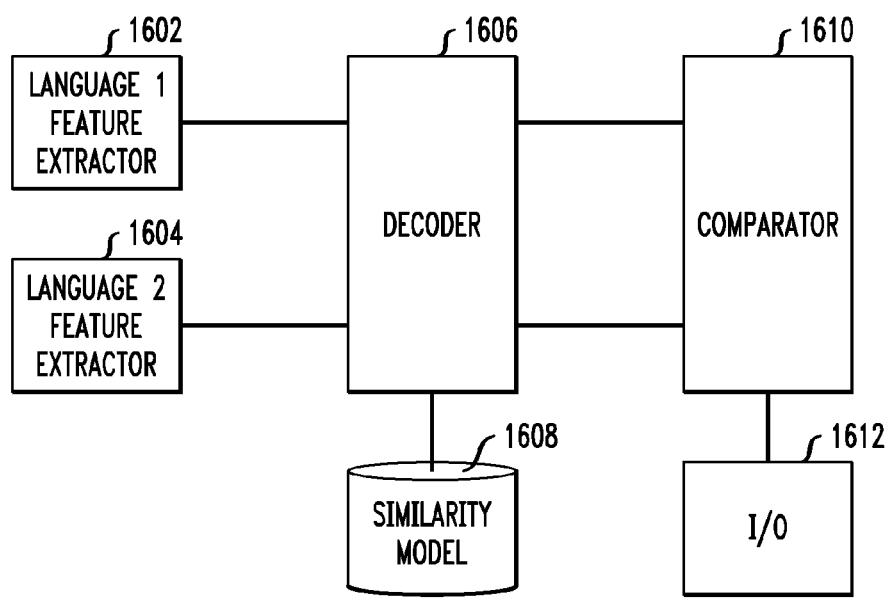

Referring to FIG. 16, in one or more embodiments, train a similarity model 1608 and carry out feature extraction (in general, using a feature extractor 1602 for the first language and a feature extractor 1604 for the second language). For example, if the first language is English, feature extractor 1602 separates the letters by spaces; if the second language is Chinese, the feature extractor 1604 renders the characters into Pinyin (or other suitable Romanization scheme) and then separates the letters in the Pinyin by spaces.

Decoder 1606 uses similarity model 1608 to generate a score based on the extracted features; the score is the output of the decoder 1606. Comparator 1610 uses a threshold or the like to compare to the score and then output the result with input-output module 1612.

With regard to the extraction steps, and with further consideration to the English-Chinese example, one or more embodiments can handle simplified Chinese characters as used on the mainland and/or traditional Chinese characters as used on Taiwan. The Chinese characters, traditional or simplified, may, for example, be encoded via UTF-8 encoding or GB encoding. They are Romanized by mapping to Pinyin. This process is fixed, based on a standard dictionary; i.e., a one-to-one mapping which is not lossy or ambiguous. The result is Pinyin coded in ASCII. Tones are not needed in one or more embodiments. In one or more embodiments, English feature extraction starts with ASCII characters and each individual letter is separated by a space in the feature extraction.

During a comparison step, a similarity measure of the two different feature sets is made by decoder 1606 using model 1608. In one or more embodiments, this is treated as an alignment problem, i.e., see if the two feature sets align with each other. As described with regard to FIG. 1, seek the shortest path from the lower corner to the upper corner. One or more embodiments consider the score when there is a move of one block; each block is a similarity function between two features. Therefore, a determination is made regarding the similarity between two features. That is to say, look for the probability of the English feature of the vertical axis given foreign language feature on the horizontal axis (or the reverse can be done; symmetry may not be present in some cases).

There are several different ways to calculate this similarity; one or more available techniques may be used in one or more embodiments. One non-limiting example includes phrase table extraction as used in machine translation; determine the conditional probability of the English feature sequence (one or more features) given the foreign feature sequence (one or more features), and vice-versa.

In one or more embodiments, training data is required to develop similarity model 1608. The training data includes a number of pairs that are known to be the same. Some embodiments use approximately 1000-3000 pairs; this is a relatively small corpus. For each pair, there will be feature 1, feature 2, . . . feature X in English and feature 1, feature 2, . . . feature Y in the foreign language. First, an alignment process is carried out via, for example, HMM or maximum entropy. This process is used, e.g., to determine that feature 1 in English and feature 2 in the foreign language are known to correspond.

The result is a database 1608 containing a model. Alignment techniques are, in and of themselves, well-known; given the teachings herein, the skilled artisan will be able to implement one or more embodiments using one or more known alignment techniques to carry out alignment on the training data. Based on the alignment process, the relationship of feature sequences from English to foreign pairs is determined to obtain the probabilities. This yields the database 1608 with a model that has the known conditional probabilities in it for the feature sequences f, where e denotes English and F denotes foreign:

$p(\tilde{f}e_i | \tilde{f}_{Fi})$

Some embodiments carry out Viterbi alignment via standard dynamic programming techniques. Refer to FIG. 13. The edit distance equals the distance between two strings.

Consider d-e-g on the horizontal axis versus d-x-g on the vertical axis. This is called substitution error (substitute one thing for another—there is something on each axis but they do not match). Consider a-b on the horizontal axis; this is an insertion error (something is inserted on one axis that has no counterpart on the other axis). One or more embodiments find the shortest path. There are several recursive algorithms that can be used. Dynamic time warping or dynamic programming or Viterbi alignment are appropriate in one or more embodiments. These things are known in and of themselves; given the teachings herein, the skilled artisan will he able to use same to implement one or more embodiments. Some embodiments utilize weighting, wherein some sounds may have a different weight than others, since probability is not zero or one. Weighted edit distance is known in and of itself; given the teachings herein, the skilled artisan will be able to use same to implement one or more embodiments.

Thus, one or more embodiments implement comparison with decoder 1606 based on a model 1608 developed in training, using the weighted edit distance technique. Weighting is optional. Viterbi alignment, well-known in the machine translation field, is one non-limiting example of how this can be carried out. The Viterbi algorithm is a dynamic programming algorithm for finding the most likely sequence of hidden states—called the Viterbi path—that results in a sequence of observed events, especially in the context of Markov information sources and hidden Markov models.

MCE training is optional and is in itself well known; given the teachings herein, the skilled artisan will be able to use same to enhance performance in one or more embodiments.

Furthermore with regard to weighting, one or more embodiments take training data and try to align each pair and determine which feature sequences exist together the most. Then, based on counting, the probability of the feature sequence given by the other feature sequences can be determined. This yields the conditional probabilities discussed elsewhere herein. There are a number of known routines and/or toolkits available to carry out this kind of alignment; given the teachings herein, the skilled artisan will be able to use same to implement one or more embodiments. Non-limiting exemplary suitable machine translation toolkits include GIZA++ or Moses; the skilled artisan is familiar with same.

Referring again to FIG. 16, feature extractors 1602, 1604 can be implemented in software on a general purpose computer; one extractor may be provided for each language. Romanizing is deterministic; the Linguistic Data Consortium (LDC) and/or various known web sites provide dictionaries and/or deterministic Romanization rules for Chinese, Korean, Japanese, and other languages. Perl, C, Java, or another suitable programming language can be used to code a simple routine to separate words into letters and put spaces therebetween; Perl has some useful routines available.

Decoder 1606 uses similarity model 1608 determined from training data; the output of block 1606 is a score. Decoder 1606 may carry out, for example, Viterbi alignment via standard dynamic programming techniques, or may use other suitable techniques. Model 1608 includes the conditional probabilities from the training stage described elsewhere herein.

Comparator 1610 compares the score to one or more thresholds; it may be implemented, for example, in one or more high level language comparison statements. I/O module 1612 outputs a corresponding indication; e.g., a yes or no, for example, or a more complex series of alternatives, e.g., match, mismatch, somewhat matched, somewhat mismatched. It can be implemented using a GUI or the like.

Given the discussion thus far, it will be appreciated that, in general terms, an exemplary orthographic method for transliteration pair matching, according to an aspect of the invention, includes the step of extracting feature sequences, as individual letters separated by spaces, from a digital representation of a proper name in a first language to obtain a first orthographic (i.e., using the letters of the alphabet not phonemes) feature sequence set. A further step includes extracting feature sequences, as individual letters separated by spaces, from a digital representation of a proper name in a second language to obtain a second feature sequence set. The digital representation of the proper name in the first language and the digital representation of the proper name in the second language are a transliteration pair. These steps can be carried out using extractors 1602, 1604, for example. Exemplary feature sequences for a phonetic approach are shown on the axes in FIG. 1; letters separated by spaces can be used in an orthographic approach.

A still further step includes comparing the first and second orthographic feature sequence sets to determine a similarity score, based on a similarity model including a plurality of conditional probabilities of known orthographic feature sequences in the first language given known orthographic feature sequences in the second language and a plurality of conditional probabilities of known orthographic feature sequences in the second language given known orthographic feature sequences in the first language; this step can be carried out, for example, by decoder 1606 using similarity model 1608. An even further step includes, based on at least one threshold value, determining whether the transliteration pair belong to an identical actual proper name. This step can be carried out, for example, with comparator 1610.

Figure 15:
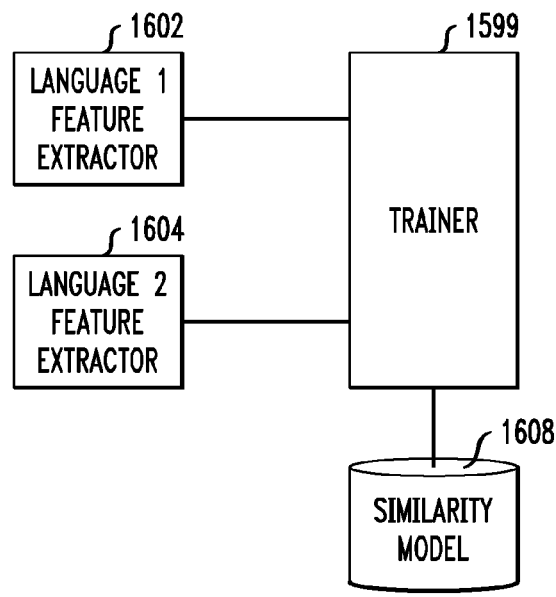
FIGS. 15 and 16 show exemplary software architecture diagrams for training and use, in accordance with an aspect of the invention.

A further step in some cases includes building the similarity model using statistical machine translation phrase tables or other suitable techniques. As seen in FIG. 15, language 1 and language 2 feature extractors 1602, 1604 operate on a suitable training corpus (not shown) and trainer 1599 uses a suitable technique such as statistical machine translation phrase tables (optionally with minimum classification error) to build the similarity model 1608.

Many different languages can be handled. In some cases, the first language is character based (e.g., simplified or traditional Chinese; Japanese; or Korean), and a further step includes rendering the digital representation of the proper name in the first language into a Romanized form (Pinyin is a nonlimiting example in the case of Chinese) prior to extracting the feature sequences for the digital representation of the proper name in the first language as the individual letters separated by spaces.

In general, in the extracting steps, the feature sequences can include single features or multiple features.

A number of techniques can be used to implement the comparing step; some embodiments carry out Viterbi alignment based on a similarity model. The similarity model can be estimated, for example, based on discriminative training. Optionally, the model can be updated using minimum classification error training.

In some cases, the determining step includes indicating that the transliteration pair indeed belongs to the identical actual proper name if the similarity score exceeds at least one threshold value; i.e., in a simple approach, if the score is above a threshold, there is a match; if the score is below a threshold, there is no match. More sophisticated approaches can be used in other cases; for example, multiple thresholds can be used to categorize results as matched, likely matched, likely unmatched, and unmatched. Other categories could be used in other embodiments.

In one or more embodiments, when the method is repeated for multiple additional transliteration pairs, an EER of less than two percent is noted.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 17:
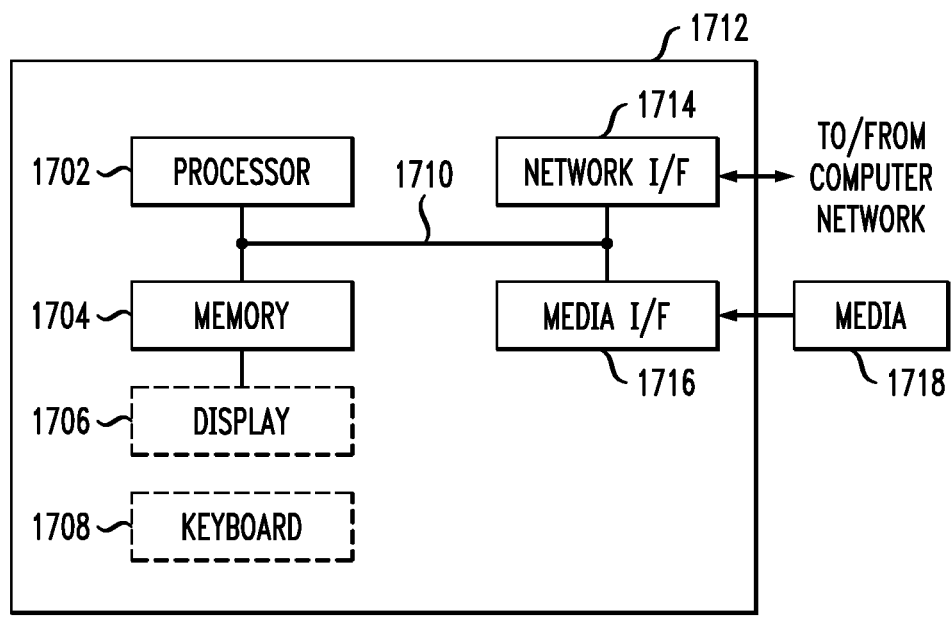
FIG. 17 depicts a computer system that may be useful in implementing one or more aspects and/or elements of the invention.

One or more embodiments can make use of software running on a general purpose computer or workstation. With reference to FIG. 17, such an implementation might employ, for example, a processor 1702, a memory 1704, and an input/output interface formed, for example, by a display 1706 and a keyboard 1708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1702, memory 1704, and input/output interface such as display 1706 and keyboard 1708 can be interconnected, for example, via bus 1710 as part of a data processing unit 1712. Suitable interconnections, for example via bus 1710, can also be provided to a network interface 1714, such as a network card, which can be provided to interface with a computer network, and to a media interface 1716, such as a diskette or CD-ROM drive, which can be provided to interface with media 1718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1702 coupled directly or indirectly to memory elements 1704 through a system bus 1710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1708, displays 1706, pointing devices, and the like) can be coupled to the system either directly (such as via bus 1710) or through intervening I/O controllers (omitted for clarity).

Network adapters such as network interface 1714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1712 as shown in FIG. 17) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Perl is useful in one or more embodiments. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also he loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a first language feature extraction module, a second language feature extraction module, a decoder module, and a comparator module. The method steps can then be carried out using the distinct software modules and/or sub-modules of the system, as described above, executing on one or more hardware processors 1702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An orthographic method for transliteration pair matching, said method comprising:
   extracting feature sequences, as individual letters separated by spaces, from a digital representation of a proper name in a first language to obtain a first orthographic feature sequence set;
   extracting feature sequences, as individual letters separated by spaces, from a digital representation of a proper name in a second language to obtain a second orthographic feature sequence set, said digital representation of said proper name in said first language and said digital representation of said proper name in said second language comprising a transliteration pair;
   comparing said first and second orthographic feature sequence sets to determine a similarity score, based on a similarity model comprising a plurality of conditional probabilities of known orthographic feature sequences in said first language given known orthographic feature sequences in said second language and a plurality of conditional probabilities of known orthographic feature sequences in said second language given known orthographic feature sequences in said first language; and based on at least one threshold value, determining whether said transliteration pair belong to an identical actual proper name.

2. The method of claim 1, further comprising building said similarity model using statistical machine translation phrase tables.

3. The method of claim 2, wherein said first language is character-based, further comprising rendering said digital representation of said proper name in said first language into a Romanized form prior to extracting said feature sequences for said digital representation of said proper name in said first language as said individual letters separated by spaces.

4. The method of claim 2, wherein, in said extracting steps, at least some of said feature sequences comprise multiple features.

5. The method of claim 2, wherein said comparing comprises carrying out Viterbi alignment based on said similarity model.

6. The method of claim 2, further comprising estimating said similarity model based on discriminative training.

7. The method of claim 6, further comprising updating said similarity model using minimum classification error training.

8. The method of claim 1, wherein said determining comprises indicating that said transliteration pair indeed belong to said identical actual proper name if said similarity score exceeds at least one threshold value.

9. The method of claim 1, wherein said extracting, comparing, and determining steps are repeated for a plurality of additional transliteration pairs with an equal error rate of less than two percent.

10. The method of claim 1, further comprising providing a system, wherein the system comprises distinct software modules, each of the distinct software modules being embodied on a non-transitory computer-readable storage medium, and wherein the distinct software modules comprise a first language feature extraction module, a second language feature extraction module, a decoder module, and a comparator module;

wherein:

said extracting of said feature sequences from said digital representation of said proper name in said first language is carried out by said first language feature extraction module executing on at least one hardware processor;

said extracting of said feature sequences from said digital representation of said proper name in said second language is carried out by said second language feature extraction module executing on at least one hardware processor;

said comparing of said first and second orthographic feature sequence sets is carried out by said decoder module executing on said at least one hardware processor; and said determining whether said transliteration pair belong to an identical actual proper name is carried out by said comparator module executing on said at least one hardware processor.

11. A non-transitory computer readable medium comprising computer executable instructions which when executed by a computer cause the computer to perform a method for transliteration pair matching, the method comprising the steps of:

extracting feature sequences, as individual letters separated by spaces, from a digital representation of a proper name in a first language to obtain a first orthographic feature sequence set;

extracting feature sequences, as individual letters separated by spaces, from a digital representation of a proper name in a second language to obtain a second orthographic feature sequence set, said digital representation of said proper name in said first language and said digital representation of said proper name in said second language comprising a transliteration pair;

comparing said first and second orthographic feature sequence sets to determine a similarity score, based on a similarity model comprising a plurality of conditional probabilities of known orthographic feature sequences in said first language given known orthographic feature sequences in said second language and a plurality of conditional probabilities of known orthographic feature sequences in said second language given known orthographic feature sequences in said first language; and based on at least one threshold value, determining whether said transliteration pair belong to an identical actual proper name.

12. The non-transitory computer readable medium of claim 11, wherein the method further comprises building said similarity model using statistical machine translation phrase tables.

13. The non-transitory computer readable medium of claim 12, wherein said first language is character-based, wherein the method further comprises rendering said digital representation of said proper name in said first language into a Romanized form prior to extracting said feature sequences for said digital representation of said proper name in said first language as said individual letters separated by spaces.

14. The non-transitory computer readable medium of claim 12, wherein, in said steps of extracting feature sequences, at least some of said feature sequences comprise multiple features.

15. The non-transitory computer readable medium of claim 12, wherein said comparing comprises carrying out Viterbi alignment based on said similarity model.

16. The non-transitory computer readable medium of claim 12, wherein the method further comprises estimating said similarity model based on discriminative training.

17. The non-transitory computer readable medium of claim 16, wherein the method further comprises updating said similarity model using minimum classification error training.

18. The non-transitory computer readable medium of claim 11, wherein said determining comprises indicating that said transliteration pair indeed belong to said identical actual proper name if said similarity score exceeds at least one threshold value.

19. The non-transitory computer readable medium of claim 11, wherein the method further comprises repeating said extracting, comparing, and determining for a plurality of additional transliteration pairs with an equal error rate of less than two percent.

20. An apparatus for transliteration pair matching comprising:

a memory; and at least one processor, coupled to said memory, and operative to:

extract feature sequences, as individual letters separated by spaces, from a digital representation of a proper name in a first language to obtain a first orthographic feature sequence set;

extract feature sequences, as individual letters separated by spaces, from a digital representation of a proper name in a second language to obtain a second orthographic feature sequence set, said digital representation of said proper name in said first language and said digital representation of said proper name in said second language comprising a transliteration pair;
compare said first and second orthographic feature sequence sets to determine a similarity score, based on a similarity model comprising a plurality of conditional probabilities of known orthographic feature sequences in said first language given known orthographic feature sequences in said second language and a plurality of conditional probabilities of known orthographic feature sequences in said second language given known orthographic feature sequences in said first language; and
based on at least one threshold value, determine whether said transliteration pair belong to an identical actual proper name.

21. The apparatus of claim 20, wherein said at least one processor is further operative to build said similarity model using statistical machine translation phrase tables.

22. The apparatus of claim 21, wherein said first language is character-based, and wherein said at least one processor is further operative to render said digital representation of said proper name in said first language into a Romanized form prior to extracting said feature sequences for said digital representation of said proper name in said first language as said individual letters separated by spaces.

23. The apparatus of claim 21, wherein at least some of said feature sequences comprise multiple features.

24. The apparatus of claim 20, further comprising a plurality of distinct software modules, each of the distinct software modules being embodied on a non-transitory computer-readable storage medium, and wherein the distinct software modules comprise a first language feature extraction module, a second language feature extraction module, a decoder module, and a comparator module;
wherein:
said at least one processor is operative to extract said feature sequences from said digital representation of said proper name in said first language by executing said first language feature extraction module;
said at least one processor is operative to extract said feature sequences from said digital representation of said proper name in said second language by executing said second language feature extraction module;
said at least one processor is operative to compare said first and second orthographic feature sequence sets by executing said decoder module; and
said at least one processor is operative to determine whether said transliteration pair belong to an identical actual proper name by executing said comparator module.

25. An apparatus for transliteration pair matching comprising:
means for extracting feature sequences, as individual letters separated by spaces, from a digital representation of a proper name in a first language to obtain a first orthographic feature sequence set;
means for extracting feature sequences, as individual letters separated by spaces, from a digital representation of a proper name in a second language to obtain a second orthographic feature sequence set, said digital representation of said proper name in said first language and said digital representation of said proper name in said second language comprising a transliteration pair;
means for comparing said first and second orthographic feature sequence sets to determine a similarity score, based on a similarity model comprising a plurality of conditional probabilities of known orthographic feature sequences in said first language given known orthographic feature sequences in said second language and a plurality of conditional probabilities of known orthographic feature sequences in said second language given known orthographic feature sequences in said first language; and
means for, based on at least one threshold value, determining whether said transliteration pair belong to an identical actual proper name.

* * * * *